United States Patent
Shimizu

(10) Patent No.: US 10,951,141 B2
(45) Date of Patent: Mar. 16, 2021

(54) POSITION MANAGEMENT APPARATUS AND ASSISTING APPARATUS

(71) Applicant: FUJI CORPORATION, Chiryu (JP)

(72) Inventor: Satoshi Shimizu, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 135 days.

(21) Appl. No.: 16/314,114

(22) PCT Filed: Jul. 14, 2016

(86) PCT No.: PCT/JP2016/070793
§ 371 (c)(1),
(2) Date: Dec. 28, 2018

(87) PCT Pub. No.: WO2018/011937
PCT Pub. Date: Jan. 18, 2018

(65) Prior Publication Data
US 2019/0238075 A1     Aug. 1, 2019

(51) Int. Cl.
*H02P 6/16*      (2016.01)
*H02P 29/00*    (2016.01)
(Continued)

(52) U.S. Cl.
CPC ............. *H02P 6/16* (2013.01); *A61G 5/14* (2013.01); *H02P 6/04* (2013.01); *H02P 6/24* (2013.01);
(Continued)

(58) Field of Classification Search
CPC .... H02P 6/16; H02P 29/00; H02P 6/04; H02P 6/24; H02P 2203/03; H02P 1/04;
(Continued)

(56) References Cited

U.S. PATENT DOCUMENTS

| 3,716,770 A * | 2/1973 | Habisohn | H02P 27/02 |
| | | | 318/259 |
| 3,940,701 A * | 2/1976 | Novitski | H03G 1/02 |
| | | | 455/352 |

(Continued)

FOREIGN PATENT DOCUMENTS

CN     102320275 A     1/2012
CN     205281162 U     6/2016
(Continued)

OTHER PUBLICATIONS

International Search Report dated Oct. 11, 2016, in PCT/JP2016/070793, filed Jul. 14, 2016.
(Continued)

*Primary Examiner* — Peter M. Cuomo
*Assistant Examiner* — Myles A Throop
(74) *Attorney, Agent, or Firm* — Oblon, McClelland, Maier & Neustadt, L.L.P.

(57) ABSTRACT

A position management apparatus includes motors connected to a power supply; a position detecting device connected to the power supply and detecting the rotational position of the motors or the drive position of driving members driven by the motors; position storage devices connected to the power supply and storing the rotational position or the drive position detected by the position detecting devices; and a power cut-off delay circuit for keeping the position detecting devices and the position storage devices connected to the power supply even if the power switch is shut off from a conducting state, and for storing the rotational position or the drive position of the position storage devices after the motor has lost its rotational speed.

6 Claims, 4 Drawing Sheets

(51) Int. Cl.
  *A61G 5/14* (2006.01)
  *H02P 6/04* (2016.01)
  *H02P 6/24* (2006.01)
(52) U.S. Cl.
  CPC .......... *H02P 29/00* (2013.01); *H02P 2203/03* (2013.01)
(58) Field of Classification Search
  CPC .. H02P 3/04; H02P 29/04; A61G 5/14; A61G 7/1019; A61G 5/00
  See application file for complete search history.

(56) References Cited

U.S. PATENT DOCUMENTS

| | | | | | |
|---|---|---|---|---|---|
| 4,056,160 | A | * | 11/1977 | Abels | B62D 5/06 |
| | | | | | 180/423 |
| 4,251,759 | A | * | 2/1981 | Boldt | G01P 3/487 |
| | | | | | 318/449 |
| 5,023,527 | A | * | 6/1991 | Erdman | F23N 3/082 |
| | | | | | 318/400.34 |
| 5,296,786 | A | * | 3/1994 | Habisohn | H02P 1/026 |
| | | | | | 318/264 |
| 5,309,068 | A | * | 5/1994 | Hakkarainen | H05B 41/36 |
| | | | | | 315/226 |
| 6,104,113 | A | * | 8/2000 | Beifus | H02K 29/12 |
| | | | | | 310/156.05 |
| 10,792,204 | B2 | * | 10/2020 | Nomura | A61G 7/1096 |
| 2009/0045792 | A1 | * | 2/2009 | Sugawara | H02J 7/0029 |
| | | | | | 323/282 |
| 2011/0187286 | A1 | * | 8/2011 | Salvestrini | H05B 47/10 |
| | | | | | 315/307 |
| 2011/0187332 | A1 | * | 8/2011 | Salvestrini | H05B 47/10 |
| | | | | | 323/234 |
| 2012/0235661 | A1 | * | 9/2012 | Roessler | H03K 17/0822 |
| | | | | | 323/284 |
| 2016/0057841 | A1 | * | 2/2016 | Lenig | H05B 45/50 |
| | | | | | 315/291 |
| 2017/0128293 | A1 | * | 5/2017 | Tsusaka | A61H 3/04 |
| 2019/0238075 | A1 | * | 8/2019 | Shimizu | H02P 29/00 |

FOREIGN PATENT DOCUMENTS

| | | |
|---|---|---|
| JP | 2001-269892 A | 10/2001 |
| JP | 2001269892 * | 10/2001 |
| JP | 2007-192785 A | 8/2007 |
| JP | 2016-64124 A | 4/2016 |

OTHER PUBLICATIONS

Written Opinion dated Jul. 23, 2019, in Singapore Patent Application No. 11201811098V, citing documents AO-AR therein, 5 pages.

* cited by examiner

POSITION MANAGEMENT APPARATUS AND ASSISTING APPARATUS

TECHNICAL FIELD

The present application relates to a position management apparatus for managing a drive position of a driving member driven by a motor and to an assisting apparatus provided with the position management apparatus.

BACKGROUND ART

The need for assisting apparatuses has increased with the aging of society. Assisting apparatuses assist care receivers in transferring, moving, and going to the toilet, and have, among assisting functions, a function of assisting care receivers in standing up and sitting down. The introduction of an assisting apparatus reduces the physical burden on caregivers, thereby preventing lower back pain and the like as well as mitigating shortages in caregiving staff. In this type of assisting apparatus, a motor is generally used as a driving source. Further, in order to manage the drive position of the driving member driven by the motor, an encoder for detecting the rotational position of the motor is used. Encoders are widely applied not only in assisting apparatuses but also in various types of motor devices for consumer use and industrial use. Patent Literature 1 discloses an example of technology for managing the drive position of a driving member using an encoder.

An absolute-position detecting device attached to an electric servo cylinder of Patent Literature 1 includes an incremental encoder, an absolute position measuring counter circuit, a backup power supply, and a power supply control circuit. When the main power supply of a servo motor is cut off, the power supply control circuit connects the incremental encoder and the absolute position measuring counter circuit to a backup power supply, the absolute position counter circuit stores the final count value after confirming that the servo motor has stopped, and then the backup power supply is cut off. As a result, the absolute position detecting operation can be restarted without difficulty when the main power supply is restored due to the final count value being accurately stored.

PATENT LITERATURE

Patent Literature 1: Japanese Patent Application Laid-Open No. 2007-192785

BRIEF SUMMARY

Technical Problem

As well as the motor of Patent Literature 1, motors generally do not stop abruptly but continue rotating due to inertia. Therefore, an encoder and a counter circuit driven by the same power supply cannot detect the inertial rotation, and a detection error occurs. The detection error causes a shift in the drive position of the driven member in the assisting apparatus. Further, detection errors may accumulate due to repeated power shutdowns. This type of detection error can also occur in detecting units other than the encoder. In order to eliminate the detection error, two methods are conventionally used.

The first method uses an absolute encoder. In the absolute encoder, since detection of the absolute rotation amount of the motor can be restarted when the power supply is restored, the detection error generated when the power supply was stopped is automatically resolved. Absolute encoders, however, are more expensive than incremental encoders, increasing the equipment cost of the position management device.

The second method is a method in which a backup power supply is provided as in Patent Literature 1, and the incremental encoder and the counter circuit are operated even after the power supply to the motor is cut off. However, since a backup power supply is required in addition to the power supply for driving the motor, the cost of the position management device increases. If power is supplied to the incremental encoder and the counter circuit at all times, a detection error does not occur, but standby power is required when the motor is stopped, resulting in a running cost.

It is an object of the present disclosure to provide a low-cost position management apparatus capable of accurately managing the drive position of a driven member without being affected by the inertial rotation of the motor when the power supply is cut off.

Solution to Problem

The position management apparatus of the present disclosure includes: a motor connected to a power supply via a power switch; a position detecting device which operates by being connected to the power supply and is configured to detect a rotational position of the motor or a drive position of a driving member driven by the motor; a position storage device which operates by being connected to the power supply and is configured to store the rotational position or the drive position detected by the position detecting device; and a power cut-off delay circuit is configured to keep the position detecting device and the position storage device connected to the power supply even if the power switch is turned off from a conducting state, and to cut off the position detecting device and the position storage device from the power supply after inertial rotation of the motor has stopped and the position storage device has stored the rotational position or the drive position.

Advantageous Effects

In the position management apparatus of the present disclosure, the motor cut off from the power supply by turning off the power switch rotates inertially and eventually stops. Then, since the position detecting device and the position storage device are maintained in a state of being connected to the power supply by the power cut-off delay circuit, the rotational position or the drive position can be detected until inertial rotation of the motor stops, which results in an accurate position being stored. When the power switch is turned on again, the activated position detecting device sets the position previously stored in the position storage device as the current position. Accordingly, the drive position of the driven member can be accurately managed without being influenced by inertial rotation of the motor when the power supply is cut off.

An inexpensive incremental encoder can be used as the position detecting device instead of an expensive absolute encoder. Further, a backup power supply other than the power supply for driving the motor is unnecessary. Further, since the power supply is cut off after inertial rotation of the motor stops and the correct rotational position or drive position is stored, standby power is also unnecessary. Thus, both device costs and running costs can be reduced.

DESCRIPTION OF EMBODIMENTS

1. Configuration of Assisting Apparatus 1 of an Embodiment

Figure 1:
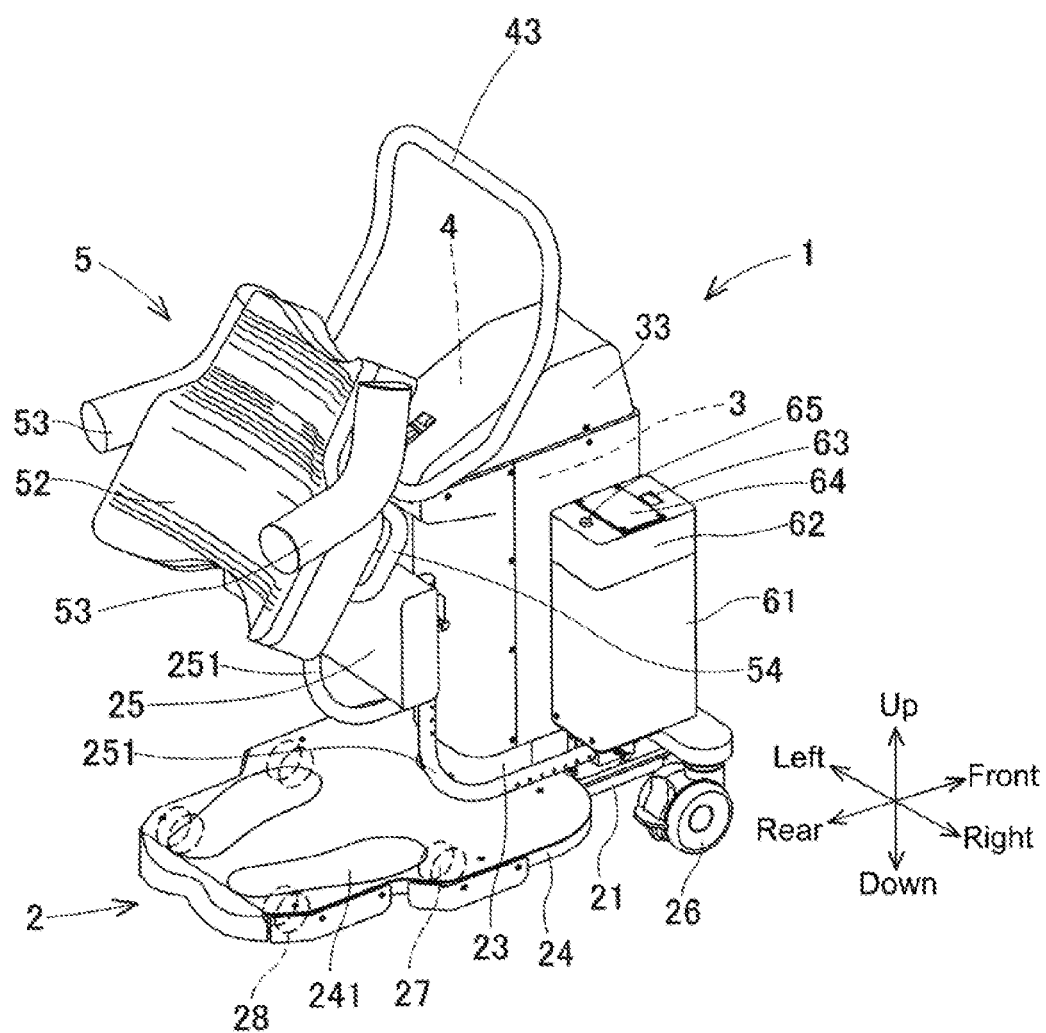
FIG. 1 is a perspective view of an assisting apparatus of an embodiment as viewed obliquely from the rear.
Figure 2:
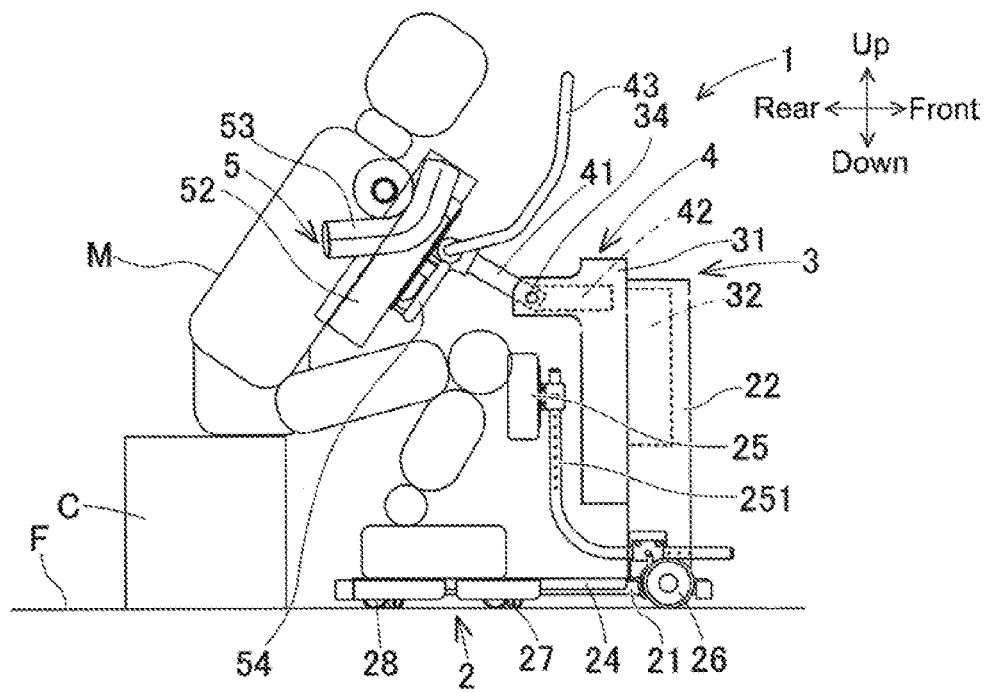
FIG. 2 is a side view showing a configuration of the assisting apparatus and a care receiver in a sitting posture.

First, position management apparatus 7 of the embodiment will be described. FIG. 1 is a perspective view of assisting apparatus 1 of the embodiment as viewed obliquely from the rear. FIG. 2 is a side view showing a configuration of assisting apparatus 1 and care receiver M in a sitting posture. The front-rear direction, the left-right direction, and the up-down direction shown in FIG. 1 are determined with reference to care receiver M shown in FIG. 2. In FIG. 2, fixed cover 23, elevator cover 33, power supply 61, and control section 62 are omitted.

Assisting apparatus 1 assists at least one of a standing action, for care receiver M sitting in chair C on floor surface F, from a sitting posture to a stand-up posture, and a seating action from the stand-up posture to the sitting posture. Further, assisting apparatus 1 can be moved by an operation of the caregiver with care receiver M placed on assisting apparatus 1 in a stand-up posture. As a result, assisting apparatus 1 is capable of assisting transferring and moving of care receiver M. Assisting apparatus 1 includes base 2, lifting and lowering section 3, pivoting section 4, supporting section 5, power supply 61, control section 62, position management apparatus 7, and the like.

Base 2 includes frame 21, support column 22, fixed cover 23, footrest 24, lower leg contact 25, six wheels 26 to 28, and the like. Frame 21 is disposed in a substantially horizontal manner in the vicinity of floor surface F. Support column 22 is erected upward from the center, in the left-right direction, at the front of frame 21. Lifting and lowering driving section 32, which will be described later, is disposed inside an inner space, having a substantially rectangular cross section, of support column 22. Fixed cover 23 covers and protects support column 22 and the lower portion of lifting and lowering member 31, which will be described later.

Footrest 24 is fixed to the rear of the upper surface of frame 21, and is disposed in a substantially horizontal manner. Feet-shaped contact mark 241 drawn on the upper surface of footrest 24 guides the position where care receiver M puts their feet. Lower leg contact 25 is disposed above footrest 24 with left and right support arms 251. Left and right front wheels 26 are disposed toward the front of the underside of frame 21. Left and right inner wheels 27 and left and right rear wheels 28 are disposed on the underside of footrest 24. Due to the steering function of wheels 26 to 28, assisting apparatus 1 is not only capable of moving in a front-rear direction and changing directions but is also capable of moving laterally (i.e., moving directly to the side) and spin-turning (i.e., rotating on the spot).

Lifting and lowering section 3 includes lifting and lowering member 31, lifting and lowering driving section 32, lifting and lowering cover 33, and the like. Lifting and lowering member 31 is an elongated member in the vertical direction and is supported by the rear surface of support column 22 in a vertically movable manner. An upper portion of lifting and lowering member 31 protrudes rearward and pivot support section 34 is disposed near the protruding rear end. Pivot driving section 42, which will be described later, is disposed inside the upper portion of lifting and lowering member 31. Lifting and lowering driving section 32 disposed inside support column 22 includes lifting and lowering motor 35 as a driving source. When connected to power supply 61, lifting and lowering motor 35 performs a normal rotation operation or a reverse rotation operation to drive lifting and lowering member 31 up and down. Therefore, lifting and lowering member 31 is a member driven by lifting and lowering motor 35. Lifting and lowering cover 33 moves up and down together with lifting and lowering member 31, and covers and protects the periphery of lifting and lowering member 31 and support column 22.

Pivoting section 4 includes pivot arm member 41, pivot driving section 42, and the like, and is provided with first handle 43. Pivot arm member 41 is pivotably supported by pivot support section 34 of lifting and lowering member 31. Pivot driving section 42 disposed inside the upper portion of lifting and lowering member 31 has pivot motor 45 as a driving source. When connected to power supply 61, pivot motor 45 performs a normal rotation operation or a reverse rotation operation, and pivots and drives pivot arm member 41 in the front-rear direction. Therefore, pivot arm member 41 becomes a member driven by pivot motor 45. First handle 43, having a rectangular frame shape, and support section 5 are attached to pivot arm member 41. First handle 43 is gripped by care receiver M and caregivers.

Support section 5 is composed of trunk receiving section 52, right and left side receiving sections 53, and the like, and is provided with second handle 54. Using a cushion material, trunk receiving section 52 is formed into a planar shape close to the trunk shape of care receiver M and is flexibly deformed to support the trunk of care receiver M from below. Left and right side receiving sections 53 are provided on the right and left sides of trunk receiving section 52. Side receiving sections 53 support both sides of care receiver M from below. As a result, trunk receiving section 52 and side receiving sections 53 support the upper body of care receiver M in a stable manner. Second handle 54 is integrally attached to the front and lower area of trunk receiving section 52. Second handle 54 is mainly gripped by caregivers.

Power supply 61 is disposed on the left and right of support column 22 on the top side of frame 21. Power supply 61 is shared by lifting and lowering motor 35, pivot motor 45, and control section 62. A battery which can be repeatedly charged and discharged can be used as power supply 61, but the present disclosure is not limited thereto.

Control section 62 is disposed on top of right power supply 61. Control section 62 is configured using, for example, a printed circuit board on which a computer operated by software is mounted. Control section 62 includes power switch 63, display section 64, and connection section 65. Power switch 63 is connected between power supply 61 and motor driver 73 described later. Display section 64 graphically displays the height of lifting and lowering member 31, the pivoting angle of pivot arm member 41, the voltage of power supply 61, and the like.

Connection section 65 is connected to remote control device 66 (shown in FIG. 3) for inputting commands.

Control section 62 controls lifting and lowering motor 35 and pivot motor 45 based on command inputs to remote control device 66 by care receiver M or a caregiver. As a result, assisting apparatus 1 drives support section 5 by combining the vertical movement of lifting and lowering member 31 with pivoting of pivot arm member 41 in the front-rear direction, and assists at least one of the standing action and the seating action of the care receiver M.

2. Configuration of Position Management Apparatus 7 of the Embodiment

Figure 3:
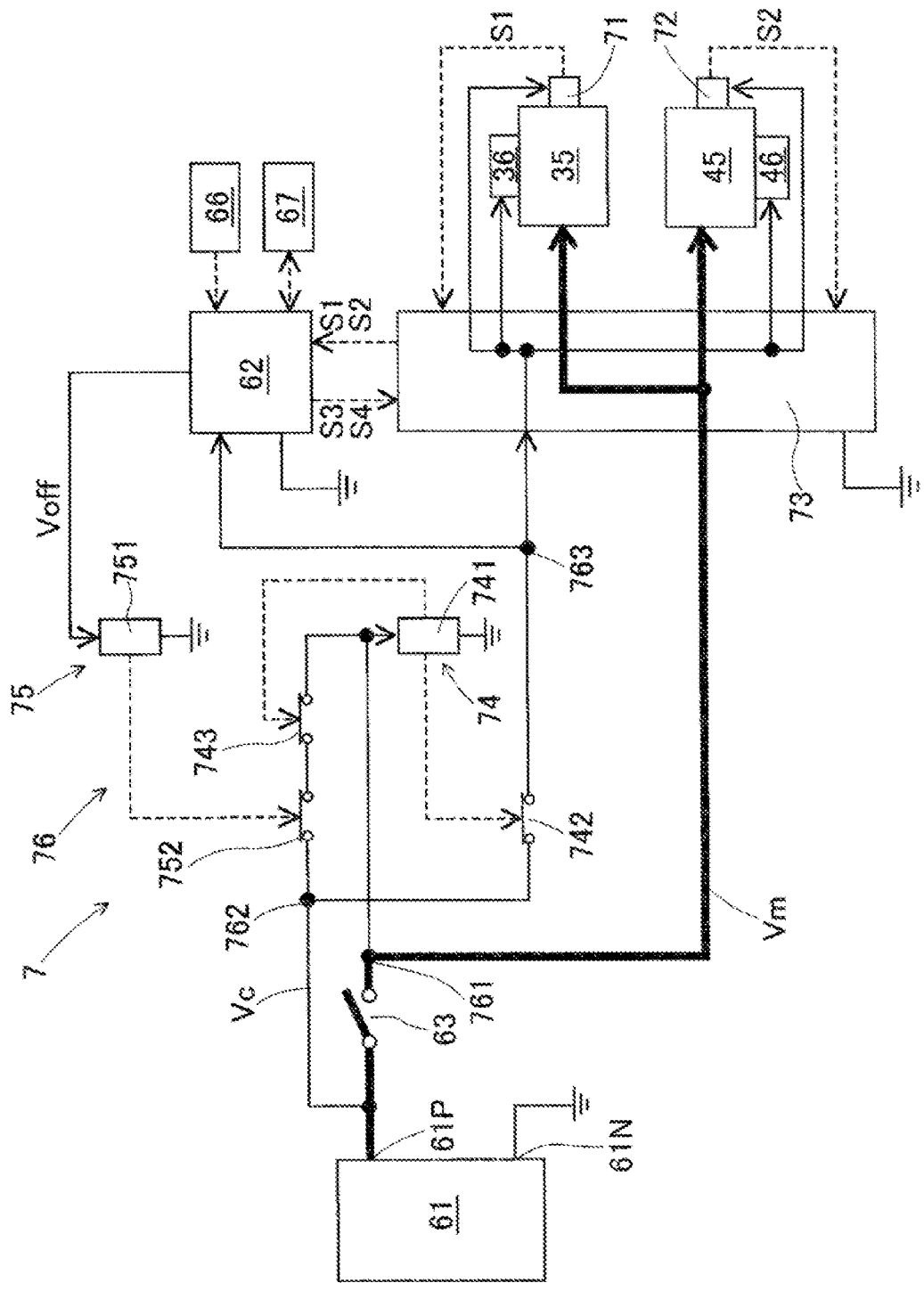
FIG. 3 is a circuit diagram of a position management apparatus of the embodiment.

Next, position management apparatus 7 of the embodiment will be described. Position management apparatus 7 manages the drive position of lifting and lowering member 31 and pivot arm member 41. FIG. 3 is a circuit diagram of position management apparatus 7 of the embodiment. In FIG. 3, the motor power supply line for supplying motor power Vm is indicated by a thick solid line and arrow, the control power supply line for supplying control power Vc is indicated by a thin solid line and arrow, and the flow of control signals is indicated by a broken line and arrow. Position management apparatus 7 includes control section 62, first incremental encoder 71, second incremental encoder 72, motor driver 73, power cut-off delay circuit 76, and the like.

As shown in FIG. 3, brake 36 is attached to lifting and lowering motor 35, and similarly, brake 46 is attached to pivot motor 45. Brake 36 and brake 46 apply braking action to lifting and lowering motor 35 and pivot motor 45, respectively, any time control power Vc is not being applied. As a result, movement of lifting and lowering member 31 and pivot arm member 41 is regulated. Upon application of control power Vc, brake 36 and brake 46 release braking to permit driving by lifting and lowering motor 35 and pivot motor 45.

First incremental encoder 71 is attached to lifting and lowering motor 35 and is connected to and driven by control power Vc. First incremental encoder 71 outputs first code signal S1 every time lifting and lowering motor 35 rotates by a predetermined angle. Second incremental encoder 72 is attached to pivot motor 45 and is connected to and driven by control power Vc. Second incremental encoder 72 outputs second code signal S2 every time pivot motor 45 rotates by a predetermined angle. Each of code signal S1 and code signal S2 is a combination of two types of signals having phases different from each other. The normal rotation and reverse rotation of lifting and lowering motor 35 and pivot motor 45 are distinguished from each other by the phase difference between the two types of signals. Known magnetic detection type rotary encoders can be used as incremental encoder 71 and incremental encoder 72, but the present disclosure is not limited thereto.

Motor power Vm and control power Vc are both supplied from positive terminal 61P of power supply 61. Negative terminal 61N of power supply 61 is commonly grounded. Motor power Vm is supplied to motor driver 73 via power switch 63 provided to the power supply line. Further, motor power Vm is separately supplied from motor driver 73 to lifting and lowering motor 35 and pivot motor 45. On the other hand, control power Vc is supplied to control section 62, motor driver 73, first incremental encoder 71, second incremental encoder 72, brake 36, and brake 46 via power cut-off delay circuit 76.

The connections of the control power supply line of control power Vc will be described in detail. As shown in FIG. 3, power cut-off delay circuit 76 includes first power supply input 761, second power supply input 762, and power supply output 763. First power supply input 761 is connected to positive terminal 61P via power switch 63. Second power input 762 is connected to positive terminal 61P in parallel with power switch 63. Power supply output 763 is connected to control section 62 and motor driver 73. Power cut-off delay circuit 76 includes first relay 74 and second relay 75.

First relay 74 has first input section 741 and main output section 742. First input section 741 is connected to first power input 761 and second power input 762. Main output section 742 is connected between second power input 762 and power supply output 763. Main output section 742 outputs power supplied to second power input 762 to power supply output 763 based on the input state of the first input section 741.

Second relay 75 has second input section 751 and second output unit 752. Second input section 751 receives a power cut-off command Voff from control section 62. Second output section 752 is connected between first input section 741 and second power supply input 762. Second output section 752 outputs power supplied to second power supply input 762 to first input section 741 until power cut-off command Voff from control section 62 is inputted to second input section 751. When power cut-off command Voff is inputted to second input section 751, second output section 752 cuts off power supply to first input section 741.

First relay 74 includes self-maintaining output section 743, which is connected in series with second output section 752. Self-maintaining output section 743 outputs power supplied to second power supply input 762 to first input section 741 according to the input state of first input section 741.

An inexpensive general-purpose electromagnetic relay can be used as first relay 74. In first relay 74 composed of an electromagnetic relay, first input section 741 is an excitation coil. Further, main output section 742 is cut off with first input section 741 being in a non-excited state and becomes an a-contact which conducts with first input section 741 being in an excited state. Further, self-maintaining output section 743 is also cut off with first input section 741 being in a non-excited state and becomes an a-contact which conducts with first input section 741 being in an excited state.

An inexpensive general-purpose electromagnetic relay can be used as second relay 75. In second relay 75 composed of an electromagnetic relay, second input section 751 is an excitation coil. When control power Vc is supplied from control section 62 to second input section 751, second input section 751 enters an excited state, and when power cut-off command Voff is received that cuts off supply of control power Vc, second input section 751 shifts to a non-excited state. Second output section 752 is cut off by the non-excited state of second input section 751 and becomes an a-contact that conducts current in the excited state of second input section 751.

Here, a large control current supplied to control section 62, motor driver 73, first incremental encoder 71, second incremental encoder 72, brake 36, and brake 46 flows through main output section 742 of first relay 74. Therefore, main output section 742 needs a current capacity corresponding to a large control current. On the other hand, a relatively small control current for exciting first input section 741 of first relay 74 flows through second output section 752 of second relay 75. Therefore, second output section 752 may have a current capacity corresponding to a relatively small control current. Further, power cut-off command Voff for controlling second output section 752 may be smaller than the control current for exciting first input section 741. Therefore, second relay 75 can be made smaller than first relay 74.

Control section 62 and motor driver 73 are connected to positive terminal 61P via power supply output 763, main output section 742, and second power input 762. Motor driver 73 relays and supplies control power Vc to first incremental encoder 71, second incremental encoder 72, brake 36, and brake 46.

Control section 62 is operated by control power Vc. Control section 62 performs a predetermined calculation based on command inputs to remote control device 66 for setting each control method of lifting and lowering motor 35 and pivot motor 45. Control section 62 further instructs motor driver 73 with control signals S3 and S4 which indicate each control method. Control signals S3 and S4 also include a method of controlling brakes 36 and 46. Control section 62 supplies control power Vc to second input section 751 during normal operation.

Motor driver 73 is operated by control power Vc. Motor driver 73 changes motor power Vm in accordance with received control signals S3 and S4, and independently adjusts the currents supplied to lifting and lowering motor 35 and pivot motor 45. Further, motor driver 73 controls the supply of control power Vc to brakes 36 and 46 in accordance with control signals S3 and S4. As a result, the rotational speed and the rotational direction of lifting and lowering motor 35 and pivot motor 45 are individually adjusted. Motor driver 73 relays first code signal S1 outputted from first incremental encoder 71 and second code signal S2 outputted from second incremental encoder 72 to control section 62.

Control section 62 counts received code signals S1 and S2 to detect the rotational positions of lifting and lowering motor 35 and pivot motor 45. Thus, control section 62 can determine the drive positions of lifting and lowering member 31 and pivot arm member 41 based on the rotational positions of lifting and lowering motor 35 and pivot motor 45. Further, control section 62 stores the detected rotational position or the obtained drive position in nonvolatile memory 67. Incremental encoders 71 and 72 and control section 62 are an embodiment of the position detecting device of the present disclosure. Control section 62 and nonvolatile memory 67 are an embodiment of the position storage device of the present disclosure.

When code signals S1 and S2 are not received for predetermined time T, control section 62 determines that the inertial rotation of lifting and lowering motor 35 and pivot motor 45 has stopped. Predetermined time T is preferably set in accordance with the stopping performance of lifting and lowering motor 35 and pivot motor 45, and is set to, for example, 0.5 seconds.

3. Operation and Use of Position Management Apparatus 7 of the Embodiment

Next, the operation of position management apparatus 7 of the embodiment will be described. In an initial state in which assisting apparatus 1 is completely stopped, when power switch 63 is turned on from being turned off, motor power Vm is supplied to motor driver 73. Further, control power Vc is supplied to first input section 741 via power switch 63 and first power supply input 761. First input section 741 is in an excited state causing main output section 742 and self-maintaining output section 743 to conduct current. As a result, control power Vc is supplied to control section 62 and motor driver 73 via first power supply input 761, main output section 742, and power supply output 763. Control section 62 and motor driver 73 start controlling lifting and lowering motor 35 and pivot motor 45, and start detecting rotational position with code signals S1 and S2.

Control section 62 supplies control power Vc to second input section 751 in conjunction with the start of control and detection. As a result, second input section 751 is in the excited state, thereby causing second output section 752 to conduct current. Through conduction of second output section 752, control power Vc is supplied to first input section 741 via the second power supply input 762. At this point, power is inputted to first input section 741 from both first power supply input 761 and second power supply input 762.

Here, it is assumed that power switch 63 is turned off during rotation of lifting and lowering motor 35 and pivot motor 45. Power switch 63 is turned off, for example, when an abnormality or an emergency occurs during the operation of assisting apparatus 1. By turning off power switch 63, motor power Vm to motor driver 73 immediately stops, and lifting and lowering motor 35 and pivot motor 45 are not supplied with power. However, even if motor power Vm turns off and brakes 36, 46 function, lifting and lowering motor 35 and pivot motor 45 cannot stop immediately, and inertial rotation continues.

On the other hand, even if there is no input from first power supply input 761, first input section 741 continues to receive power from second power supply input 762. Accordingly, the conduction state of main output section 742 is maintained, and control section 62 and motor driver 73 continue to operate. Even if control section 62 and motor driver 73 attempt to control lifting and lowering motor 35 and pivot motor 45, respectively, there is no substantial control function since motor power Vm of motor driver 73 is already turned off. On the other hand, control section 62 and motor driver 73 continue to maintain the function of detecting the rotational position from code signals S1 and S2.

That is, each time code signals S1 and S2 are received, control section 62 detects the rotational position, determines the drive position, and stores the rotational position or the drive position in non-volatile memory 67. When code signals S1 and S2 are not received for predetermined time T, control section 62 determines that inertial rotation of lifting and lowering motor 35 and pivot motor 45 has stopped. For this purpose, the correct rotational or drive position corresponding to the last received code signals S1, S2 are stored in non-volatile memory 67.

After determining that inertial rotation has stopped, control section 62 cuts off control power Vc supplied to second input section 751 and sets control power Vc to power cut-off command Voff. The excited state of second input section 751 is canceled, and second output section 752 changes to the cut-off state. This eliminates the input from second power supply input 762 to the first input section 741. Accordingly, the excited state of first input section 741 is canceled, and main output section 742 changes to the cut-off state. As a result, control section 62 and motor driver 73 stop and return to the initial state when assisting apparatus 1 is completely stopped.

Next, when power switch 63 is turned on again, control section 62 and motor driver 73 are activated. Control section 62 sets the rotational position or the drive position previously stored in nonvolatile memory 67 as the current position. Thereafter, control section 62 releases braking of brakes 36 and 46. In this way, the current position set is accurate.

As can be seen from the above description, first relay 74 continues to connect incremental encoders 71 and 72 and control section 62 to power supply 61 even when power switch 63 is turned off from the conducting state. Second relay 75 changes the excited state of first input section 741 of first relay 74 to cut off incremental encoders 71 and 72 and cut off control section 62 from power supply 61. In other words, incremental encoders 71 and 72 and control section 62 are delayed by the action of the power cut-off delay circuit 76, as compared with the turning off of power switch 63, and control power Vc is cut off. When lifting and lowering motor 35 and pivot motor 45 are inertially rotating, control section 62 continues to maintain the functions of the position detecting device and the position storage device and stores accurate positions. Therefore, when the power is turned on again, an accurate current position can be set, and detection errors of the rotational position and the drive position do not occur.

When power switch 63 is turned off while lifting and lowering motor 35 and pivot motor 45 are stopped, code signals S1 and S2 are not generated. Therefore, when predetermined time T has elapsed since the shutting down operation, the excited state of second input section 751 is cancelled, and control section 62 and motor driver 73 are stopped.

Furthermore, self-maintaining output section 743 has a fail-safe function of preventing control section 62 from operating in a state in which second output section 752 happens to somehow conduct current and power switch 63 is turned off. Self-maintaining output section 743 is not involved in the power shutdown delay.

Figure 4:
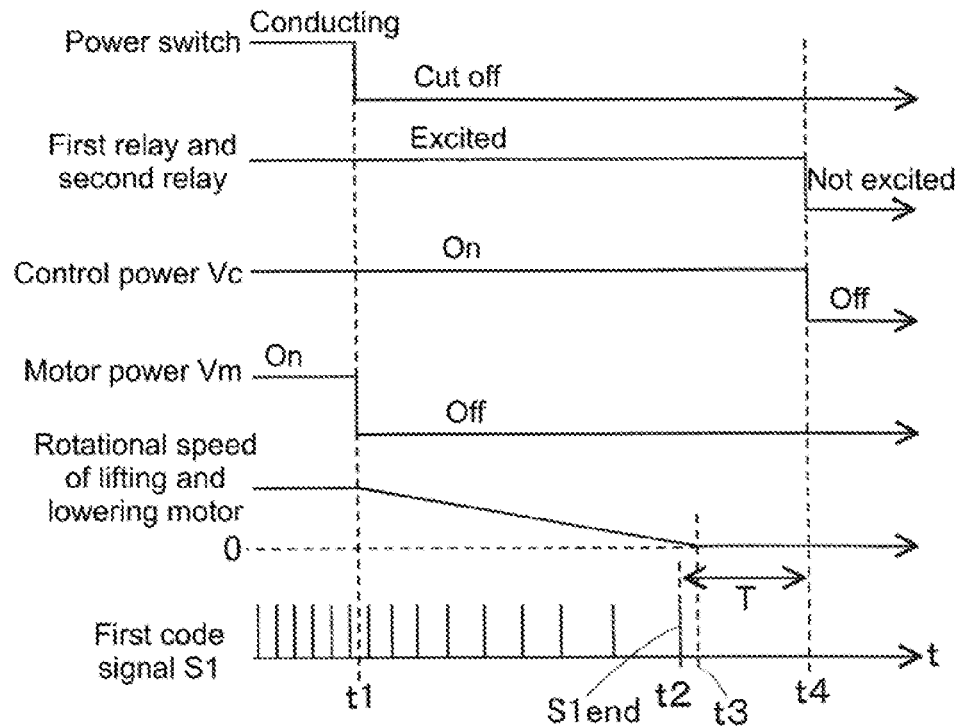
FIG. 4 is a time chart schematically illustrating an operation of the position management apparatus of the embodiment.
Figure 5:
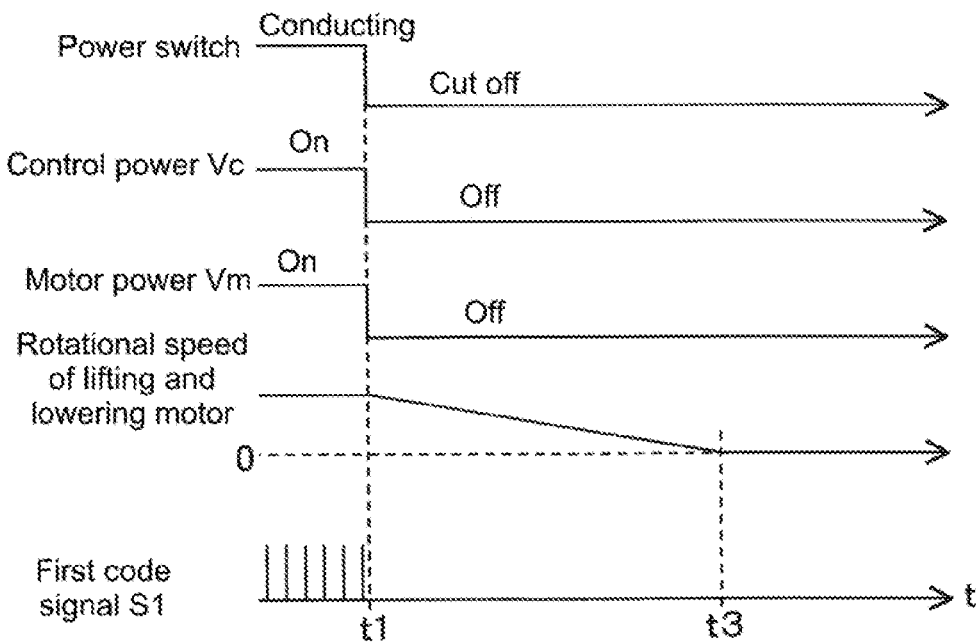
FIG. 5 is a time chart schematically illustrating the operation of the position management apparatus of a comparative example without a power cut-off delay circuit.

Next, the operation of position management apparatus 7 of the embodiment will be described in comparison with a comparative example. FIG. 4 is a time chart schematically illustrating the operation of the position management apparatus 7 according to the embodiment. FIG. 5 is a time chart schematically illustrating the operation of the position management device of the comparative example without power cut-off delay circuit 76. In FIGS. 4 and 5, the horizontal axis represents time t common to both operations. FIG. 4 and FIG. 5 illustrate cases in which power switch 63 is turned off at time t1, and then lifting and lowering motor 35 stops during rotation at time t3. In first code signal S1, only one of two types of signals having different phases is displayed simply as a pulse signal. Two types of rectangular wave signals having different phases can be used as an actual first code signal S1, but the present disclosure is not limited thereto.

In the embodiment shown in FIG. 4, before time t1, power switch 63 is turned on, first input section 741 and second input section 751 are in the excited state, and control power Vc is supplied to control section 62 and motor driver 73. Motor power Vm is supplied to lifting and lowering motor 35 via power switch 63 and motor driver 73, and lifting and lowering motor 35 rotates at a constant rotational speed. Therefore, first incremental encoder 71 outputs first code signal S1 at predetermined time intervals, and control section 62 detects the rotational position when first code signal S1 is received.

When power switch 63 is turned off at time t1, motor power Vm of lifting and lowering motor 35 turns off. As a result, lifting and lowering motor 35 shifts to inertial rotation, the rotational speed gradually decreases, and stops at time t3. On the other hand, first input section 741 of first relay 74 continues to output input power. As a result, control section 62 and motor driver 73 continue to supply control power Vc and continue to operate. Therefore, first incremental encoder 71 operates even after time t1, and outputs first code signal S1 whose time interval gradually expands in response to inertial rotation. Then, first incremental encoder 71 outputs last first code signal S1end at time t2 slightly before lifting and lowering motor 35 stops. Control section 62 receives first code signal S1 and last first code signal S1end even after time t1 so as to detect an accurate rotational position.

On the other hand, in the comparative example in which power cut-off delay circuit 76 shown in FIG. 5 is not provided, when power switch 63 is turned off at time t1, not only motor power Vm of lifting and lowering motor 35 but also control power Vc of control section 62 and motor driver 73 turn off at the same time. Therefore, first incremental encoder 71 cannot operate after time t1, and cannot output first code signals S1 and S1end after time t1. Even if first incremental encoder 71 outputs first code signals S1 and S1end at time t1 or later, control section 62 that is not in operation cannot receive the signals.

Therefore, in the comparative example, a detection error occurs corresponding to the first code signals S1 and S1end after time t1. On the other hand, since control section 62 of the embodiment receives first code signals S1 and S1end after time t1, it is possible to detect an accurate rotational position in the end. In an actual case, the resolution of first incremental encoder 71 is precise, and a larger number of first code signals S1 are outputted than shown in FIGS. 4 and 5.

4. Aspects and Effect of Position Management Apparatus 7 of the Embodiment

The position management apparatus 7 of the embodiment includes: lifting and lowering motor 35 and pivot motor 45 connected to power supply 61 via power switch 63; a position detecting device (incremental encoders 71, 72, and control section 62) which operates by being connected to power supply 61 and detects the drive positions of driving members (lifting and lowering member 31 and pivot arm member 41) driven by motors 35, 45; a position storage device (control section 62, non-volatile memory 67) which operates by being connected to power supply 61 and storing the rotational position or drive position detected by the position detecting device; and a power cut-off delay circuit (76) for keeping the position detecting device and the position storage device connected to power supply 61 even if power switch 63 is turned off from a conducting state, and for storing the rotational position or the drive position of the position storage device after motors 35, 45 have lost rotational speed.

In position management apparatus 7 of the embodiment, motors 35 and 45 cut off from power supply 61 by the turning off of power switch 63 continue to rotate inertially and eventually stop. Then, since the position detecting device and the position storage device are maintained in a state of being connected to power supply 61 by power cut-off delay circuit 76, the rotational position or the drive position can be detected until the inertial rotation of motors 35, 45 stops and an accurate position can be stored. When power switch 63 is turned on again, the activated position detecting device sets the position previously stored in the position storage device as the current position. Accordingly, the drive position of the driven member can be accurately managed without being influenced by the inertial rotation of motors 35 and 45 when power supply 61 is cut off.

Inexpensive incremental encoders 71 and 72 can be used as a position detecting device instead of expensive absolute encoders. Further, a backup power supply other than power supply 61, for driving motors 35 and 45, is unnecessary. Further, since power supply 61 is cut off after storing the correct rotational position or the drive position after inertial rotation of motors 35 and 45 stops, standby power is also unnecessary. Thus, both device costs and running costs can be reduced.

Power cut-off delay circuit 76 further includes first relay 74 for keeping the position detecting device and the position storage device connected to power supply 61 even when power switch 63 is turned off from the conducting state, and second relay 75 for changing the output state of first relay 74 to cut off the position detecting device and the position storage device from power supply 61, and the position storage device stores rotational position or drive position after detecting the stopping of inertial rotation of motors 35 and 45, and then causes second relay 75 to change the output state of first relay 74. According to this, an inexpensive electromagnetic relay can be used for first relay 74 and second relay 75 to significantly reduce the cost of the device.

Further, power cut-off delay circuit 76 comprises: first power supply input 761 which is connected to power supply 61 via power switch 63; second power supply input 762 which is connected to power supply 61 in parallel with power switch 63, and power supply output 763, which is connected to the position detecting device and the position storage device, wherein first relay 74 includes: first input section 741 which is connected to first power supply input 761 and second power supply input 762, and main output section 742 which is connected between second power supply input 762 and power supply output 763, main output section 742 outputting power supplied to second power supply input 762 to power supply output 763 based on an input status of first input section 741, and wherein second relay 75 includes: second input section 751, and second output section 752, being connected between first input section 741 and second input section 762, which outputs power supplied to second power supply input 762 to first input section 741 until a power cut-off command is inputted to second input section 751 from position storage device, while cuts off the power supplied to first input section 741 when the power cut-off command is inputted to second input section 751. With this, since power cut-off delay circuit 76 can be configured by combining first relay 74 and second relay 75 of the general-purpose product having one or two a contacts, the circuit configuration is simplified.

Further, first relay 74 has self-maintaining output section 743 connected in series with second output section 752 and outputting the power supplied to second power input 762 to the first input section 741 according to the input state of first input section 741. As a result, since the self-maintaining output section 743 has a fail-safe function, safety is enhanced.

Further, the position storage device determines that the inertial rotation of the motors 35, 45 has stopped when the rotational position or the drive position detected by the position detecting device has not changed over predetermined time T. According to this, since predetermined time T can be set in accordance with the stopping of motors 35 and 45, the stopping of motors 35 and 45 can be accurately determined.

5. Modification and Application of the Embodiment

The circuit configuration of power cut-off delay circuit 76 can be changed accordingly. For example, self-maintaining output section 743 of first relay 74 may be omitted since it is not related to the power cut-off delay. First relay 74 and second relay 75 are not limited to electromagnetic relays illustrated in the embodiment, and may be, for example, semiconductor relays. Further, incremental encoders 71 and 72 may detect drive positions of lifting and lowering member 31 and pivot arm member 41. Various other modifications and applications of the present disclosure are possible.

INDUSTRIAL APPLICABILITY

Position management apparatus 7 of the present disclosure can be used for various types of motor devices for consumer use and industrial use in addition to assisting apparatus 1 described in the embodiment. Further, the present disclosure can be applied to a lifting device for transferring care receiver M, a movable bed device for variably adjusting the lying posture and the sitting posture of care receiver M, and the like, in addition to assisting apparatus 1 for assisting at least one of the standing action and the seating action of care receiver M.

DESCRIPTION OF REFERENCE SIGNS

1: Assisting apparatus, 2: Base, 3: Lifting and lowering section, 35: Lifting and lowering motor (driven member), 4: Pivoting section, 45: Pivot Motor (driven member), 5: Support section, 61: Power supply, 62: Control section, 63: Power switch, 7: Position management apparatus, 71: First incremental encoder, 72: Second incremental encoder, 73: Motor driver, 74: First relay, 741: First input section, 742: Main output section, 743: Self-maintaining output section, 75: Second relay, 751: Second input section, 752: Second output section, 76: Power cut-off delay circuit, 761: First power supply input, 762: Second power supply input, 763: Power supply output

The invention claimed is:
1. A position management apparatus, comprising:
a motor connected to a power supply via a power switch;
a position detecting sensor which operates by being connected to the power supply and is configured to detect a rotational position of the motor or a drive position of a driving member driven by the motor;
a position storage memory which operates by being connected to the power supply and is configured to store the rotational position or the drive position detected by the position detecting sensor; and
a power cut-off delay circuit configured to keep the position detecting sensor and the position storage memory connected to the power supply even if the power switch is turned off from a conducting state, and to cut off the position detecting sensor and the position storage memory from the power supply after inertial rotation of the motor has stopped and the position storage memory has stored the rotational position or the drive position, the power cut-off delay circuit including
a first relay configured to keep the position detecting sensor and the position storage memory connected to the power supply even when the power switch is turned off from the conducting state,
a second relay configured to change an output state of the first relay to cut off the position detecting sensor and the position storage memory from the power supply,
a first power supply input which is connected to the power supply via the power switch, a second power supply input which is connected to the power supply in parallel with the power switch, and a power supply output which is connected to the position detecting sensor and the position storage memory, wherein the first relay comprises a first input section which is connected to the first power supply input and the second power supply input, wherein the second relay comprises:

a second input section, and a second output section, being connected between the first input section and the second input section, which is configured to output power supplied to the second power supply input to the first input section until a power cut-off command is inputted to the second input section from the position storage memory, while cutting off the power supplied to the first input section when the power cut-off command is inputted to the second input section, and wherein the first relay has a self-maintaining output section connected in series with the second output section and is configured to output power supplied to the second power input to the first input section according to an input state of the first input section.

2. The position management apparatus of claim 1 wherein the position storage memory is configured to store the rotational position or the drive position after detecting the stopping of inertial rotation of the motor and then cause the second relay to change the output state of the first relay.

3. The position management apparatus of claim 2, wherein the first relay comprises a main output section which is connected between the second power supply input and the power supply output, the main output section outputting power supplied to the second power supply input to the power supply output based on an input status of the first input section.

4. The position management apparatus of claim 2, wherein the position detecting sensor is an incremental encoder.

5. The position management apparatus of claim 1, wherein the position storage memory is configured to determine that the inertial rotation of the motors has stopped when the rotational position or the drive position detected by the position detecting sensor has not changed over predetermined time T.

6. An assisting apparatus, comprising:

the position management apparatus of claim 1 and a support section for supporting at least a portion of a care receiver, wherein the assisting apparatus is configured to assist the care receiver in at least one of a standing action and a seating action by driving the support section with the motor.

* * * * *